United States Patent
Pawar et al.

(10) Patent No.: US 10,588,088 B1
(45) Date of Patent: Mar. 10, 2020

(54) MINIMIZING INTERFERENCE CAUSED BY HIGH-POWERED UPLINK TRANSMISSIONS

(71) Applicant: Sprint Spectrum LP, Overland Park, KS (US)

(72) Inventors: Hemanth Pawar, Brambleton, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/642,838

(22) Filed: Jul. 6, 2017

(51) Int. Cl.
*H04W 52/24* (2009.01)
*H04W 72/04* (2009.01)

(52) U.S. Cl.
CPC ..... *H04W 52/243* (2013.01); *H04W 72/0413* (2013.01); *H04W 72/0473* (2013.01)

(58) Field of Classification Search
CPC ....... H04W 52/00–60; H04W 72/0413; H04W 72/0473
See application file for complete search history.

(56) References Cited

U.S. PATENT DOCUMENTS

| | | | |
|---|---|---|---|
| 6,259,685 B1* | 7/2001 | Rinne | H04W 16/06 370/330 |
| 6,735,447 B1* | 5/2004 | Muller | H04W 52/367 370/318 |
| 9,078,220 B2 | 7/2015 | Makhlouf et al. | |
| 2003/0185214 A1* | 10/2003 | Yang | H04L 47/14 370/395.4 |
| 2008/0141048 A1* | 6/2008 | Palmer | H04L 67/1008 713/300 |
| 2012/0008581 A1* | 1/2012 | Kojima | H04W 52/0225 370/329 |
| 2015/0111608 A1* | 4/2015 | Kazmi | H04W 52/281 455/522 |
| 2015/0229970 A1* | 8/2015 | Ma | H04L 47/20 370/260 |
| 2016/0094968 A1 | 3/2016 | Papa et al. | |
| 2016/0119881 A1* | 4/2016 | Merlin | H04W 52/146 370/328 |
| 2017/0294951 A1* | 10/2017 | Weissman | H03F 3/19 |
| 2019/0090259 A1* | 3/2019 | Oteri | H04B 7/0452 |
| 2019/0223119 A1* | 7/2019 | Takahashi | H04B 1/04 |

\* cited by examiner

*Primary Examiner* — Michael Thier
*Assistant Examiner* — Prince A Mensah (57) ABSTRACT

Minimizing interference that may potentially be caused by high-powered wireless devices to other wireless devices in the network includes determining that a first wireless device assigned to a first power class is engaged in located in a data session of a first type, and activating a high-powered transmission mode of the first wireless device. The high-powered transmission mode utilizes a first transmission power level that is associated with the first power class.

19 Claims, 5 Drawing Sheets

MINIMIZING INTERFERENCE CAUSED BY HIGH-POWERED UPLINK TRANSMISSIONS

TECHNICAL BACKGROUND

As wireless networks evolve and grow in complexity, there are ongoing challenges associated with reaching targeted coverage levels. Recently, in an effort to boost coverage and enhance throughput in wireless networks, network operators have proposed deployment of wireless devices capable of transmitting at a maximum allowable transmit power that is higher than a current maximum allowable transmit power of off-the-shelf wireless devices and/or other currently deployed standard or low powered wireless devices.

As shown in Table 1 below, the maximum allowable transmit power for wireless devices can be defined by the power class of the wireless device.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

For example, the maximum allowable transmit power level and tolerance (i.e., power error limits) with which wireless devices can transmit data on a given frequency band or sub-band (e.g., bands I-III) can be specified based on a pre-defined power class (e.g., power classes 1-4 illustrated in Table 1) of the wireless device rather than a physical maximum transmit capability of the wireless device. Off-the-shelf and/or other standard-powered (or low-powered) wireless devices are currently defined in LTE as power class 3 and/or power class 4 wireless devices. Power class 3 and/or power class 4 low-powered wireless devices can be configured with a maximum allowable transmit power level of +23 dBm for frequency bands I-III with a nominal power tolerance of ±2 dB (e.g., for E-UTRA bands). High-powered wireless devices are currently defined as power class 1 or power class 2 wireless devices. Power class 1 and/or power class 2 high-powered wireless devices can be configured with a maximum allowable transmit power level of +26 dBm for frequency bands I-II with a nominal power tolerance ±2 dB (e.g., for E-UTRA bands), as illustrated in Table 1.

Introducing additional high-powered wireless devices into a wireless network can negatively affect uplink system performance. For example, transmissions from standard-powered wireless devices (uplink transmissions) as well as signals received at the standard-powered wireless devices (downlink transmissions) may each be subject to interference caused by uplink transmissions from high-powered wireless devices operating in a high-powered transmission mode, particularly when both standard and high-powered wireless devices are operating on the same frequency band or sub-band.

OVERVIEW

Exemplary embodiments described herein include systems, methods, and processing nodes for minimizing interference that may potentially be caused by high-powered wireless devices to other wireless devices in the network. Exemplary methods for minimizing interference in a wireless network include determining that a first wireless device assigned to a first power class is engaged in located in a data session of a first type, and activating a high-powered transmission mode of the first wireless device. The high-powered transmission mode utilizes a first transmission power level that is associated with the first power class.

Exemplary systems for minimizing interference in a wireless network include processing nodes and processors for configuring the processing nodes to perform operations including setting a default maximum transmission power to a standard transmission power level for all wireless devices connected to an access node and identifying one or more high-powered wireless devices connected to the access node. The high-powered wireless devices are configured to transmit data at a high transmission power level. The operations further include activating the high transmission power level for each of the one or more high-powered wireless devices based on a traffic type associated with said each high-powered wireless device.

Exemplary processing nodes for minimizing interference in a wireless network are configured to perform operations including determining that a first wireless device assigned to a first power class is not engaged in a high-priority data session, and deactivating a high-powered transmission mode of the first wireless device. The high-powered transmission mode utilizes a first transmission power level that is associated with the first power class.

DETAILED DESCRIPTION

Exemplary embodiments herein disclose methods, systems, and processing nodes for minimizing interference caused by high-powered wireless devices by determining that a wireless device assigned to a high power class is engaged in one or more types of data sessions, and activating a high-powered transmission mode of the wireless device. The high-powered wireless device may be identified upon attempting to connect to an access node. For example, the high-powered wireless device may be identified by obtaining a power class indicator of the high-powered wireless device from an attach request received at the access node. Further, the high-powered transmission mode may be associated with the high power class, as described above. Specifically, the high-powered transmission mode utilizes a transmission power level that is associated with the high power class and is higher than a standard transmission power level associated with a standard or low power class. In other words, uplink transmissions generated by a wireless device operating in the high-powered transmission mode utilize a higher transmission power than a maximum transmission power level of uplink transmissions generated by wireless devices operating in a standard or low-powered transmission mode. In an exemplary embodiment, the standard or low transmission power level comprises any transmission power level less than or equal to 23 dBm, and the high transmission power level comprises any transmission power level greater than or equal to 26 dBm. Further, high-powered transmissions may cause interference to transmissions from the other standard and low-powered wireless device.

In embodiments described herein, the transmission power level associated with the standard or low power class may be set as a default maximum transmission power level for all wireless devices regardless of their power class, and specific wireless devices are instructed to increase their transmission power only upon determining that the specific wireless devices are engaged in specific types of data sessions. For example, upon receiving an attach request from a wireless device indicating a power class of the wireless device, the power class may be ignored, and the wireless device may be instructed to utilize the standard transmission power level until it is determined that the wireless device is engaged in one or more specific types of data transmission. Determining a type of the data session (or a traffic type) may be based on performing packet inspection, such as deep packet inspection (DPI) of data packets or data traffic transmitted to or received from the wireless device. In an exemplary embodiment, upon determining that a wireless device is assigned a high power class, the access node serving the wireless device (i.e. serving access node) may instruct a processing node to perform packet inspection of data and other traffic (such as signaling, etc.) to and from the wireless device. For the purposes of this disclosure, the term data packets, session/data session, and traffic may be considered equivalent. In either case, the packet inspection may indicate that the data packets comprise high-priority data packets. For example, high-priority data packets can indicate that the data session requires a guaranteed bit rate (GBR), or a low latency. High-priority data packets can further include any data packets associated with specific applications such as streaming, videoconferencing, voice-over-IP (VoIP), gaming, etc., and traffic associated therewith. Generally, high-priority data packets (or traffic) can be any specific application or session type as defined by a network operator. Specific applications may be determined using DPI by, for instance, inspecting a header of data packets, and obtaining a quality class indicator (QCI) or any other indicator that is associated with the specific application. This indicator may trigger the determination to activate the high-powered transmission mode of the wireless device.

Activating the high-powered transmission mode of the wireless device comprises instructing the wireless device to transmit data using the higher transmission power level. The higher transmission power level may be transmitted to the wireless device in a downlink control indicator (DCI) message. Further, an amount of uplink resources associated with the high power class may be scheduled for the wireless device, and a modulation and coding scheme (MCS) associated with the high power class may be assigned to the wireless device and/or data sessions associated therewith. Upon determining that the wireless device is no longer engaged in the high-priority data session, the high-powered transmission mode of the wireless device may be deactivated. Deactivating the high-powered transmission mode can include instructing the wireless device to transmit data using a lower transmission power level. Similar to the activation, the deactivation can include transmitting the lower transmission power level to the wireless device in a DCI message.

Thus, operations described herein include activating and deactivating the high-powered transmission mode selectively based on a session or traffic type. These and other operations are further described below with respect to the embodiments depicted in FIGS. 1-5.

Figure 1:
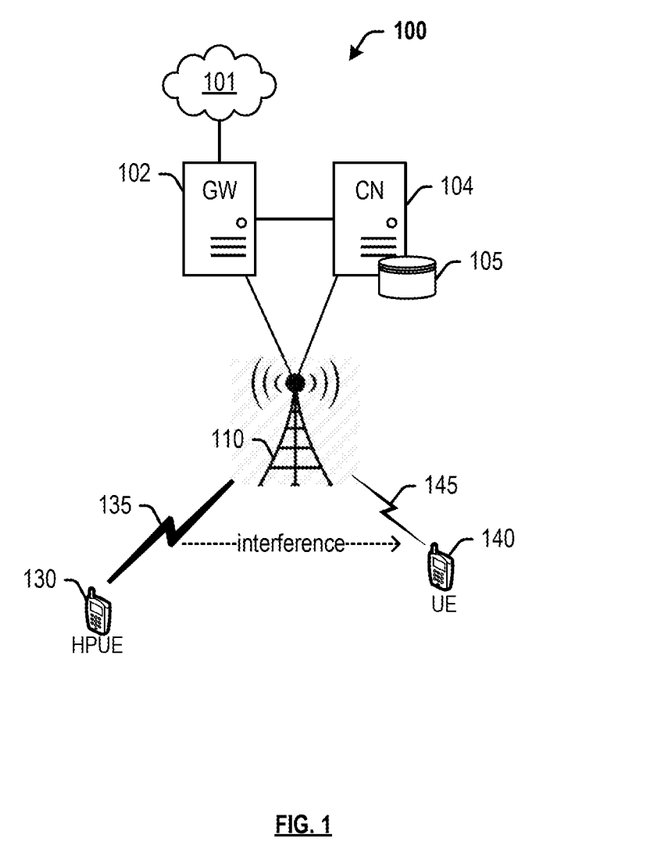
FIG. 1 depicts an exemplary system for minimizing interference in a wireless network.

FIG. 1 depicts an exemplary system 100 for minimizing interference in a wireless network. System 100 comprises a communication network 101, gateway 102, controller node 104, access node 110, and wireless devices 130 and 140. Wireless devices 130, 140 are illustrated as accessing network services from access node 110 via communication links 135, 145 respectively. Wireless device 130 may be assigned a higher transmission power class, such as power class 1 or 2, and wireless device 140 may be assigned a standard or low transmission power class, such as power class 3 or 4. Thus, high-powered wireless device 130 is illustrated as operating in a high-powered transmission mode, such that communication link 135 utilizes a transmission power typically assigned to high-powered wireless devices, enabling high-powered wireless device 130 to communicate with access node 110 over a longer distance than standard-powered wireless device 140. Further, standard-powered wireless device 140 is illustrated as operating in a standard-powered transmission mode, such that communication link 145 utilizes a standard transmission power. Although only access node 110 and wireless devices 130, 140 are illustrated in system 100, additional access nodes and wireless devices may be contemplated by those having ordinary skill in the art in light of this disclosure.

In operation, interference that may be caused by high-powered wireless device 130 to standard-powered wireless device 140 (i.e. potential interference) is minimized by setting a default maximum transmission power of wireless device 140 to a standard transmission power, and activating a high-powered transmission mode only upon determining that wireless device 130 is engaged in one or more data sessions of a specific type. These operations may include identifying high-powered wireless device 130 upon attempting to connect to access node 110 based on a power class indicator received at access node 110 from high-powered wireless device 130. Thus, the power class of high-powered wireless device 130 may be ignored, and high-powered wireless device 130 may be instructed to utilize the standard transmission power level until it is determined that it is engaged in one or more specific types of data transmission. The operations further include determining a type of the data session (or a traffic type) based on performing packet inspection, such as deep packet inspection (DPI) of data packets or data traffic transmitted to or received from high-powered wireless device 130. For example, upon determining that high-powered wireless device 130 is assigned a high power class, serving access node 110 may instruct a processing node coupled thereto (or to any other network node) to perform packet inspection of data and other traffic to and from high-powered wireless device 130. The packet inspection may indicate that the data packets comprise high-priority data packets. For example, high-priority data packets can indicate that the data session requires a guaranteed bit rate (GBR), or a low latency. High-priority data packets can further include any data packets associated with specific applications such as streaming, videoconferencing, voice-over-IP (VoIP), gaming, etc., and traffic associated therewith. Such specific applications may be determined using DPI by, for instance, inspecting a header of data packets, and obtaining a quality class indicator (QCI) or any other indicator that is associated with the specific application. This indicator may trigger the determination to activate the high-powered transmission mode of wireless device 130.

Activating the high-powered transmission mode of wireless device 130 comprises instructing wireless device 130 to transmit data using the higher transmission power level. Access node 110 (or a processing node communicatively coupled thereto) may generate a downlink control indicator (DCI) message including a maximum transmission power level higher than the standard or default transmission power level, and transmit the DCI message to wireless device 130. Further, an amount of uplink resources associated with the high power class may be scheduled for wireless device 130, and a modulation and coding scheme (MCS) associated with the high power class may be assigned to wireless device 130 and/or data sessions associated therewith. In other words, wireless device 130 is treated appropriately for its high power class, rather than as a standard-powered wireless device. Further, upon determining that wireless device 130 is no longer engaged in the high-priority data session, the high-powered transmission mode of wireless device 130 may be deactivated by, for instance, transmitting the standard transmission power level as a maximum transmission power level in a DCI message to wireless device 130.

Access node 110 can be any network node configured to provide communication between wireless devices 130, 140 and communication network 101, including standard access nodes and/or short range, low power, small access nodes. For instance, access node 110 may include any standard access node, such as a macro-cell access node, base transceiver station, a radio base station, an eNodeB device, an enhanced eNodeB device, or the like. In an exemplary embodiment, a macro-cell access node can have a coverage area in the range of approximately five kilometers to thirty-five kilometers and an output power in the tens of watts. In another embodiment, access node 110 can be a small-cell access node including a microcell access node, a picocell access node, a femtocell access node, or the like such as a home NodeB or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar. Components of exemplary access nodes are further described with reference to FIG. 2.

Wireless devices 130, 140 may be any device, system, combination of devices, or other such communication platform capable of communicating wirelessly with access node 110 using one or more carriers deployed therefrom. Each of wireless devices 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible. Components of exemplary wireless device and transmission power capabilities thereof are further described with reference to FIG. 3.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, 140. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, Ti, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as locations, power class assignments, and transmission mode capabilities of wireless devices 130, 140, presence and transmit power allowances of access node 110, and so on. This information may be requested by or shared with access node 110 via communication links 106, 107, ×2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
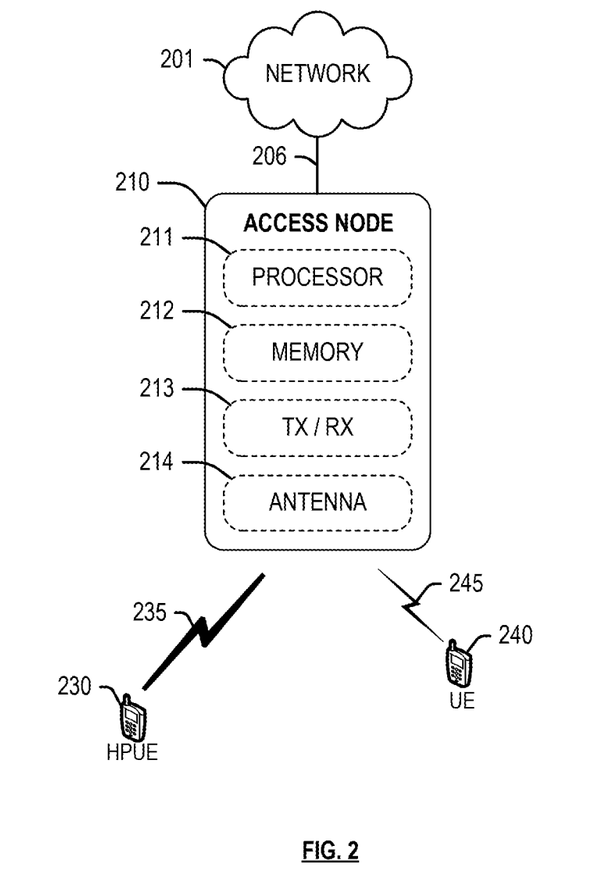
FIG. 2 depicts an exemplary access node.

FIG. 2 depicts an exemplary access node 210 for minimizing interference. Access node 210 may comprise, for example, a macro-cell or a small-cell access node, such as access node 110 described with reference to FIG. 1. Access node 210 provides wireless devices 230, 240 with access to network services and applications on network 201. Access node 210 is illustrated as comprising a processor 211, memory 212, transceiver 213, and antenna 214. Processor 211 executes instructions stored on memory 212, while transceiver 213 and antenna 214 enable communication with wireless devices 230, 240 over communication links 235, 245, respectively. Instructions stored on memory 212 can include instructions for setting a default maximum transmission power level at a standard level (i.e. ignoring a power class indicator of high-powered wireless devices) and instructing certain high-powered wireless devices to increase their transmission power level only upon determining that the certain high-powered wireless devices are engaged in specific types of data sessions. For example, memory 212 may further include a processing module for determining a type of the data session (or a traffic type) based on deep packet inspection (DPI) subsequent to determining that wireless device 230 is assigned a high power class, and adjusting the maximum transmit power of wireless device 230 based thereon. For example, the packet inspection may indicate that the data packets comprise high-priority data packets such as guaranteed bit rate (GBR) data packets, packets associated with a low-latency requirement, or any data packets associated with specific applications such as streaming, videoconferencing, voice-over-IP (VoIP), gaming, etc. Activating the high-powered transmission mode of wireless device 230 can include instructing wireless device 230 to transmit data using the higher transmission power level by, for instance, transmitting the higher transmission power level to wireless device 230 in a downlink control indicator (DCI) message. Further, a scheduling module on memory 212 may be configured to schedule uplink resources and assign an MCS for wireless device 230 according to a higher power class.

Figure 3:
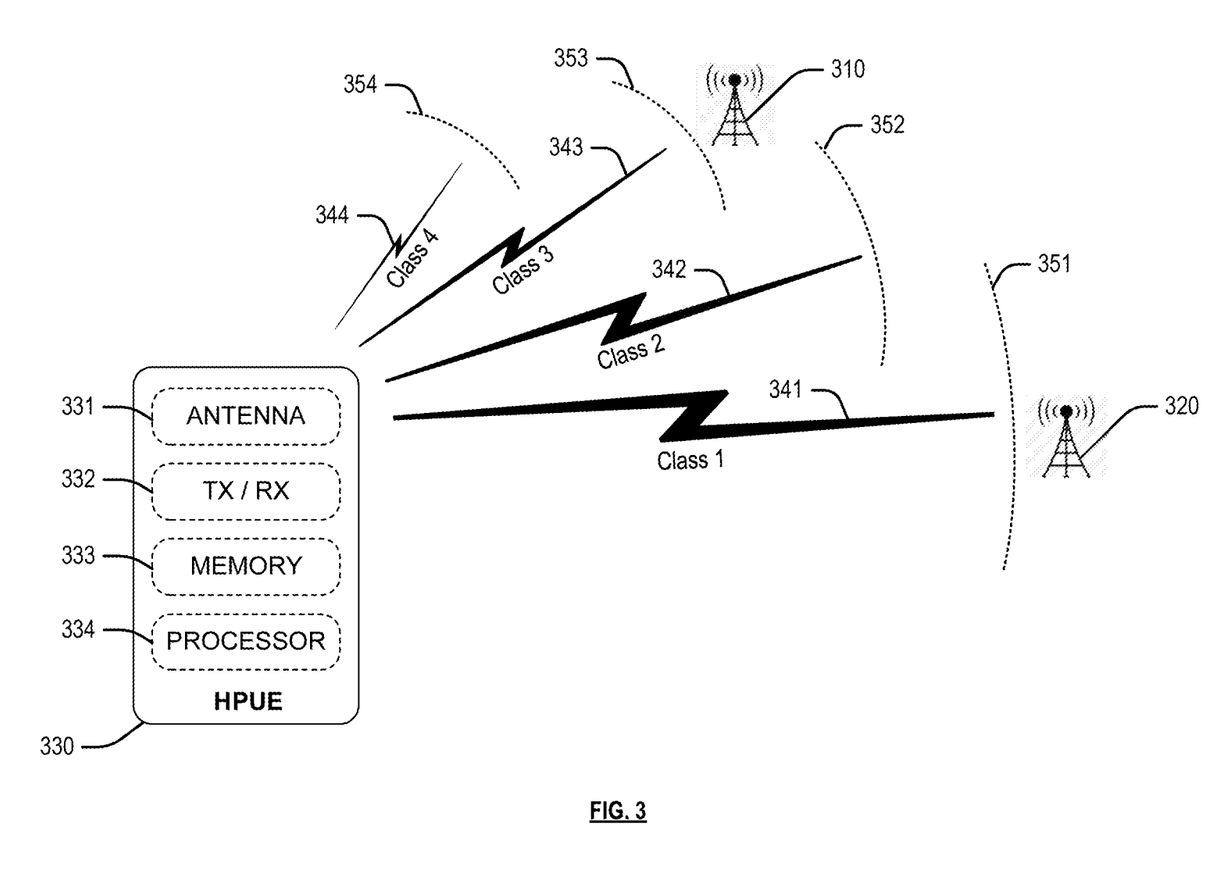
FIG. 3 depicts an exemplary wireless device utilizing a plurality of transmission power classes.

FIG. 3 depicts an exemplary wireless device 330 capable of transmission in several power classes. As noted above, wireless devices can be configured as different power class wireless devices (e.g., high-powered wireless devices and/or standard-power wireless devices as well as low-power wireless devices). Wireless device 330 is therefore equipped with an appropriate antenna 331 and transceiver 332 enabling increased transmit power from wireless device 330 to one or more access node 310, 320. For example, wireless device 330 is capable of operating in a transmission mode utilizing power class 1, which enables uplink transmission 341 at a range 351. Wireless device 330 may further switch transmission modes to utilizing power class 2 to transmit uplink transmission 342 at a range 352, utilizing power class 3 to transmit uplink transmission 343 at a range 353, and utilizing power class 4 to transmit uplink transmission 344 at a range 354. Antenna 331 and transceiver 332 are appropriately configured to utilize these differently-powered transmission modes.

Further, the range of the uplink transmissions 341-344 can affect an effective coverage area of an access node. For example, the effective coverage area of an access node, such as one of access nodes 310, 320, can be limited by an amount of power available to wireless device 330. Thus, when wireless device 330 operates in a high-powered transmission mode, it can communicate with access nodes from a longer distance than standard-power wireless devices. For example, when wireless device is assigned power class 3, uplink transmission 343 is transmitted at a power level that enables communication with access node 310 at range 353. To communicate with access node 320, which is further away from wireless device 330 (i.e. at range 351), wireless device 330 may be assigned power class 1, which enables a higher-powered uplink transmission 341. Consequently, real-time adjustment of the power classes of wireless devices such as wireless device 330 can be performed by network operators to increase the effective coverage area of their access nodes, enabling more consumers will to use a given access node. Moreover, controlling the transmission power level or changing the power class of wireless device 330 can be performed by setting a maximum uplink transmission power value allowed by a serving access node to be equal to a standard maximum uplink transmission power value associated with standard-powered wireless devices, and broadcasting the standard maximum uplink transmission power value to wireless device 330 via a system information message such as, for example, a downlink control indicator (DCI) message.

Figure 4:
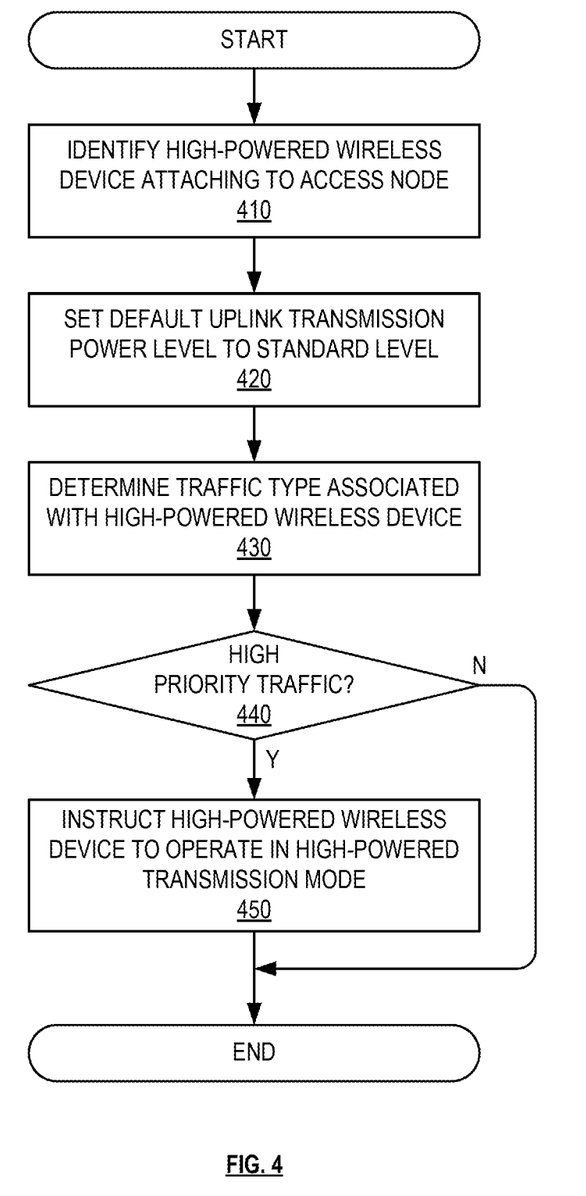
FIG. 4 depicts an exemplary method for minimizing interference in a wireless network.

FIG. 4 depicts an exemplary method for minimizing interference in a wireless network. The method of FIG. 4 may be implemented by an access node such as access node 110, by a controller node such as controller node 104, or by any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a high-powered wireless device is identified by, for instance, obtaining a power class indicator of the high-powered wireless device from an attach request received at an access node. The power class of the wireless device enables a high-powered transmission mode, as described herein. Specifically, the high-powered transmission mode utilizes a transmission power level that is associated with the high power class and is higher than a standard transmission power level associated with a standard or low power class. At 420, to minimize potential interference caused to other wireless devices in the network, the transmission power level associated with a standard or low power class may be set as a default maximum transmission power level for all wireless devices regardless of their power class. For example, upon receiving an attach request from a wireless device indicating a power class of the wireless device, the power class may be ignored, and the wireless device may be instructed to utilize the standard transmission power level until it is determined that the wireless device is engaged in one or more specific types of data transmission.

Thus, at 430, a traffic type is determined for the high-powered wireless device. Determining the traffic type can include determining a type of the data session based on performing packet inspection, such as deep packet inspection (DPI) of data packets or data traffic transmitted to or received from the wireless device. The packet inspection may indicate that the data packets comprise high-priority data packets. For example, high-priority data packets can indicate that the data session requires a guaranteed bit rate (GBR), or a low latency. High-priority data packets can further include any data packets associated with specific applications such as streaming, videoconferencing, voice-over-IP (VoIP), gaming, etc., and traffic associated therewith. Such specific applications may be determined using DPI by, for instance, inspecting a header of data packets, and obtaining a quality class indicator (QCI) or any other indicator that is associated with the specific application. At 440, this indicator may be used to determine whether to activate the high-powered transmission mode of the wireless device.

If the decision at 440 indicates high-priority traffic, then at 450, a high-powered transmission mode is activated for the wireless device. Activating the high-powered transmission mode of the wireless device comprises instructing the wireless device to transmit data using the higher transmission power level. The higher transmission power level may be transmitted to the wireless device in a downlink control indicator (DCI) message. Further, an amount of uplink resources associated with the high power class may be scheduled for the wireless device, and a modulation and coding scheme (MCS) associated with the high power class may be assigned to the wireless device and/or data sessions associated therewith. Not shown but evident to those having ordinary skill in the art in light of this disclosure includes an optional step of determining that the wireless device is no longer engaged in the high-priority data session and deactivating the high-powered transmission mode of the wireless device.

The methods, systems, devices, networks, access nodes, and equipment described above may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access nodes 110, 120, controller node 104, and/or network 101.

Figure 5:
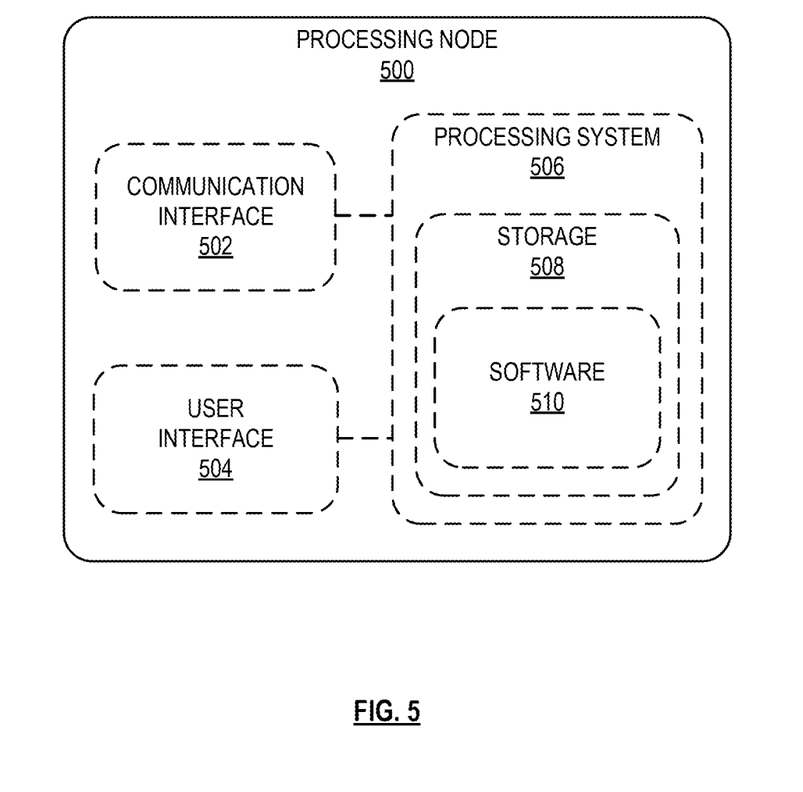
FIG. 5 depicts an exemplary processing node for minimizing interference in a wireless network.

FIG. 5 depicts an exemplary processing node for controlling a transmit power of wireless devices in a wireless network. Processing node 500 comprises a communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. For example, storage 508 may include a buffer. Software 510 may include computer programs, firmware, or some other form of machine-readable instructions, including an operating system, utilities, drivers, network interfaces, applications, or some other type of software. For example, software 510 may include a module for performing transmit power control operations described herein. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for minimizing interference in a wireless network, the method comprising:
    setting a default maximum transmission power to a standard transmission power level for all wireless devices connected to an access node;
    determining that a first wireless device connected to the access node and assigned to a first power class is engaged in a data session of a first type, wherein wireless devices assigned to the first power class are configured to transmit data at a high transmission power level greater than the standard transmission power level; and
    activating a high-powered transmission mode of the first wireless device,
    wherein the high-powered transmission mode utilizes the high transmission power level.

2. The method of claim 1, wherein activating the high-powered transmission mode of the first wireless device comprises instructing the first wireless device to transmit data using the high transmission power level.

3. The method of claim 2, further comprising transmitting the high transmission power level to the first wireless device in a downlink control indicator message.

4. The method of claim 1, further comprising scheduling an amount of uplink resources for the first wireless device, the amount of uplink resources being associated with the first power class.

5. The method of claim 1, further comprising assigning, to the first wireless device, a modulation and coding scheme (MCS) associated with the first power class.

6. The method of claim 1, further comprising:
    determining that the first wireless device is no longer engaged in the data session of the first type; and
    deactivating the high-powered transmission mode of the first wireless device.

7. The method of claim 6, wherein deactivating the high-powered transmission mode of the first wireless device comprises instructing the first wireless device to transmit data using the standard transmission power level.

8. The method of claim 7, further comprising transmitting the standard transmission power level to the first wireless device in a downlink control indicator message.

9. The method of claim 1, further comprising determining that the data session is of the first type based on performing packet inspection of data packets transmitted to or received from the first wireless device.

10. The method of claim 9, wherein the packet inspection indicates that the data packets comprise high-priority data packets.

11. The method of claim 9, wherein the packet inspection indicates the data packets comprise guaranteed bit rate (GBR) data packets.

12. A system for minimizing interference in a wireless network, the system comprising:
    a processing node; and
    a processor coupled to the processing node, the processor for configuring the processing node to perform operations comprising:
        setting a default maximum transmission power to a standard transmission power level for all wireless devices connected to an access node;
        identifying one or more high-powered wireless devices connected to the access node, wherein the high-powered wireless devices are configured to transmit data at a high transmission power level greater than the standard transmission power level; and
        activating the high transmission power level for each of the one or more high-powered wireless devices based on a traffic type associated with said each high-powered wireless device.

13. The system of claim 12, wherein the default transmission power level comprises any transmission power level less than or equal to 23 dBm.

14. The system of claim 13, wherein the high transmission power level comprises any transmission power level greater than or equal to 26 dBm.

15. The system of claim 12, wherein identifying the one or more high-powered wireless devices comprises obtaining a power class indicator of each high-powered wireless device from an attach request received from each high-powered wireless device.

16. The system of claim 12, wherein the traffic type comprises one or more of: video streaming traffic, gaming traffic, voice-over-IP (VoIP) traffic, guaranteed bit rate (GBR) traffic, and high-priority traffic.

17. A processing node for minimizing interference in a wireless network, the processing node being configured to perform operations comprising:
    setting a default maximum transmission power to a standard transmission power level for all wireless devices connected to an access node;
    determining that a first wireless device connected to the access node and assigned to a first power class is not engaged in a high-priority data session, wherein wireless devices assigned to the first power class are configured to transmit data at a high transmission power level greater than the standard transmission power level; and
    deactivating a high-powered transmission mode of the first wireless device,
    wherein the high-powered transmission mode utilizes the high transmission power level.

18. The processing node of claim 17, wherein determining that a first wireless device is not engaged in the high-priority data session comprises determining that the first wireless device is not engaged in any of a video streaming session, a gaming session, a voice-over-IP (VoIP) session, or a guaranteed bit rate (GBR) session.

19. The processing node of claim 17, wherein deactivating the high-powered transmission mode comprises instructing the first wireless device to utilize the standard transmission power level.

* * * * *